United States Patent [19]

Ramet et al.

[11] Patent Number: 4,498,999

[45] Date of Patent: * Feb. 12, 1985

[54] PROCESS FOR THE HEATING AND/OR THERMAL CONDITIONING OF A BUILDING BY MEANS OF A HEAT PUMP OPERATED WITH A SPECIFIC MIXTURE OF WORKING FLUIDS

[75] Inventors: Claude Ramet, Paris; Alexandre Rojey, Garches, both of France

[73] Assignee: Institut Francais du Petrole, Rueil-Malmaison, France

[*] Notice: The portion of the term of this patent subsequent to Jan. 31, 2001 has been disclaimed.

[21] Appl. No.: 438,424

[22] Filed: Nov. 2, 1982

Related U.S. Application Data

[63] Continuation-in-part of Ser. No. 381,903, May 25, 1982.

[30] Foreign Application Priority Data

Oct. 19, 1981 [FR] France .................................. 8119734

[51] Int. Cl.³ ................................................ C09L 5/04
[52] U.S. Cl. ........................................ 252/67; 62/114
[58] Field of Search ............................. 62/114; 252/67

[56] References Cited

U.S. PATENT DOCUMENTS

| | | | |
|---|---|---|---|
| 2,255,595 | 9/1941 | Hubacker | 62/116 |
| 3,487,653 | 1/1970 | Myre | 62/76 |
| 4,089,186 | 5/1978 | Rojey et al. | 62/101 |
| 4,303,536 | 12/1981 | Orfeo et al. | 252/67 |
| 4,344,292 | 8/1982 | Rojey | 252/67 |
| 4,428,853 | 1/1984 | Ramet et al. | 252/67 |

FOREIGN PATENT DOCUMENTS 0011971 6/1980 European Pat. Off.
1063416 3/1967 United Kingdom.

Primary Examiner—Paul Lieberman
Assistant Examiner—Hoa Van Le
Attorney, Agent, or Firm—Millen and White

[57] ABSTRACT

Buildings are advantageously heated or heat-conditioned with a heat pump operated with a non-azeotropic mixture consisting essentially of two working fluids, with the mixture comprising a major component of monochlorodifluoromethane (R 22) and a minor component of trifluoromethane (R 23).

7 Claims, 2 Drawing Figures

PROCESS FOR THE HEATING AND/OR THERMAL CONDITIONING OF A BUILDING BY MEANS OF A HEAT PUMP OPERATED WITH A SPECIFIC MIXTURE OF WORKING FLUIDS

This application is a continuation-in-part of our patent application Ser. No. 381,903, filed May 25, 1982.

BACKGROUND OF THE INVENTION

The use of non-azeotropic fluid mixtures in a heat pump, in order to improve the performance coefficient of the heat pump, has been the object of prior U.S. patents and (U.S. Pat. No. 4,089,186; U.S. Pat. No. 4,344,292, No. 227,844 filed Jan. 23, 1981 and No. 339,565 filed Jan. 15, 1982).

More specifically, U.S. patent application No. 226,984 describes the use of non-azeotropic mixtures of two constituents capable of increasing the performance of a heat pump and thus, to decrease the operating cost of said heat pump. The two constituent mixtures described therein do not increase, however, the thermal power of a given compressor.

Other mixtures of working fluids are disclosed in the following patents:

GB Pat. No. 1,063,416 discloses a mixture of R 13, i.e., chlorodifluoromethane with R 23, i.e., monochlorodifluoromethane, useful at a low refrigeration temperature.

EP Pat. No. 0,011,971 discloses a mixture of R 22, i.e., monochlorodifluoromethane, with R 32, i.e. difluoromethane.

U.S. Pat. No. 3,487,653 discloses a mixture of R 12, i.e., dichlorodifluoromethane, R 22 or R 502, i.e., a mixture of 48.8% b.w. chlorodifluoromethane and 51.2% b.w. chloropentafluoromethane with either R 13 or R 503, i.e., a mixture by weight of 40.10% trifluoromethane and 59.9% chlorotrifluoromethane. The proportions are selected to operate at a temperature lower than −65° C.

U.S. Pat. No. 2,255,585 discloses a large number of refrigerant mixtures.

SUMMARY OF THE INVENTION

The object of the present invention is to provide a specific fluid mixture which can be used to increase the thermal powder delivered by a heat pump, as compared to the case where the same pump operates with a pure fluid. It is thus possible to reduce the investment cost by using the fluid mixture of the invention in heat pumps. As a matter of fact, the mixed working fluid of the invention results in an increase in the thermal capacity of a given heat pump, without modification of the parts of said heat pump, particularly without modification of the compressor.

There are known two conventional means of increasing the thermal power of a heat pump; a first means consists of equipping the pump with a compressor of greater capacity, to thereby increase the sucked or drawn in volume, but this technique increases the investment cost. The other means to increase the thermal capacity of a heat pump is to use a working fluid whose boiling point is lower than that of the conventional fluid. However, this substitution leads to a decrease in the performance coefficient and also to a narrower range of use of the pump, since the fluid of lower boiling point has generally a lower critical temperature.

The proposed invention concerns conventional applications of heat pumps, more particularly those wherein the usually employed working fluid is monochlorodifluoromethane (R 22; boiling point: −40.8° C.) or dichlorodifluoromethane (R 12; boiling point: −29.8° C.).

The above-mentioned halogenated fluids are commonly employed in heat pump installations used for heating or conditioning houses, for town heating and for low temperature industrial applications, such as certain operations of drying or concentration. The use of monochlorodifluoromethane (R 22) is quite common in the heat pumps used in heating and making use, as a cold source, of underground water, water from wells or rivers, external air or extracted air, and, as a heat source, heating water or internal air, for temperatures which can reach 55° C. at the heat source.

The principle of the invention consists of selecting a specific mixture of fluids which do not form a common azeotrope, said mixture being characterized in that it is composed of a major component, which is monochlorodifluoromethane (R 22) and a minor component of lower boiling point, which is trifluoromethane (R 23; boiling point: −82.1° C.). More specifically, the mixture may comprise 99 to 70% by mole of R 22 and 1 to 30% by mole of R 23, preferably 97 to 75% by mole of R 22 and 3 to 25% by mole of R 23. According to a further more preferred embodiment, the mixture consists essentially of 95 to 80% by mole of R 22 and 5 to 20% by mole of R 23.

DETAILED DISCUSSION OF THE INVENTION

Figure 1:
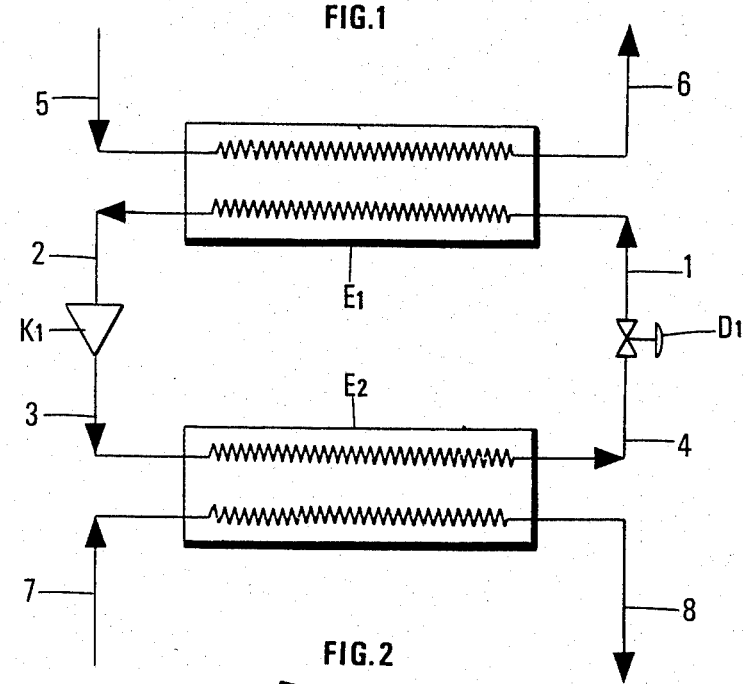
FIG. 1 is a schematic diagram of a water/water heat pump system in which the composition of the present invention can be employed.

In the cycle of a given heat pump, under identical operating conditions, the evaporation pressure of a mixture of the above type is higher, under otherwise unchanged conditions, than the evaporation pressure of the major constituent thereof when used in pure state.

Consequently, the molar volume of the vapor sucked or drawn by the compressor is lower, which, for a compressor of a given capacity, increases the molar flow rate of the fluid and thus, the thermal capacity of the heat pump. Moreover, the use of a mixed working fluid comprising a major constituent (R 22), and a minor constituent (R 23) of lower boiling temperature generally results in a reduction of the compression rate. This increases the volumetric yield in the case of reciprocating compressors and is thus also favorable to an increase of the thermal capacity. The greater the molar concentration of the minor constituent, the higher the thermal capacity. However, a too high proportion of this constituent results in a decrease of the performance coefficient and in an excessive condensation pressure. As a matter of fact, the compressors have a domain of use limited by certain working parameters (maximum output temperature and pressure; maximum pressure difference). The condensation pressure of a mixture conforming to the invention is preferably lower than 30 bars.

The mixtures of fluids proposed in this invention can be used more particularly when the temperature of the warm source is comprised, preferably, between 20° and 75° C. and that of the cold source, preferably, between −15° and +40° C.

The heat pumps to be operated with the above mixtures may be of any type. The compressor may be, for example, a lubricated piston compressor, a dry piston compressor, a screw compressor or a centrifuge compressor. The exchangers may be for example, double pipe exchangers, shell-and-tube exchangers, plate exchangers or conventional finned exchangers for heat transfer with air. A counter-current heat exchange mode is preferred; the latter performs well in the case of coaxial exchangers as used for water/coolant exchanges in heat pumps of small power. It may be performed approximately in the air/coolant exchangers such as disclosed in the U.S. patent application Ser. No. 227,844. The thermal power obtained may vary, for example, between a few kilowatts for heat pumps used in domestic heating and several megawatts for heat pumps designed for collective heating.

A preferred embodiment for use is disclosed in the U.S. application No. 339,565.

This embodiment comprises the following steps:

(a)—the mixed working fluid is compressed in the vapor phase, (b)—the compressed mixed fluid issued from step (a) is contacted in thermal exchange relationship with a relatively cold external fluid and said contact is maintained up to the substantially complete condensation of said mixed fluid, (c)—the substantially completely condensed mixed fluid issued from step (b) is contacted in thermal exchange relationship with a cooling fluid as defined in step (f), so as to further cool said mixed fluid, (d)—the cooled mixed fluid issued from step (c) is expanded, (e)—the expanded mixed fluid issued from step (d) is contacted in thermal exchange relationship with an external fluid which forms the heat source, the conditions of contact providing for the partial vaporization of said expanded mixed fluid, (f)—the partially vaporized mixed fluid issued from step (e) is contacted in heat exchange relationship with the substantially entirely liquefied mixed fluid fed to step (c), said partially vaporized mixed fluid forming the cooling fluid of said step (c), the contact conditions being such as to complete the vaporization partially effected in step (e), and (g)—the vaporized mixed fluid issued from step (f) is fed back to step (a).

The following examples illustrate operations performed with specific fluid mixtures conforming to the invention.

EXAMPLE 1

The water/water heat pump of FIG. 1 comprises an evaporator E 1 wherein the mixture is introduced through duct 1 and wherefrom it is withdrawn in the vaporized state through duct 2, a compressor K 1 where the vapor mixture is compressed and wherefrom it is discharged through duct 3 to be fed to condenser E 2, wherefrom it is withdrawn in the condensed state through duct 4; it is then expanded through expansion valve D 1 and recycled to the evaporator. The evaporator and the condenser consist of double-tube exchangers wherethrough the fluids participating to the thermal exchange circulate in counter-current.

The cold source consists of water withdrawn from an underground field. This water is fed to evaporator E 1 through duct 5 at a temperature of 12° C. and withdrawn from evaporator E 1 through duct 6 at a temperature of 5° C.

The water which is heated in condenser E 2 is supplied through duct 7 and discharged through duct 8.

Two operating manners are contemplated, depending on the nature of the heating system and the water return temperature.

A—Heating by radiators

Temperature of the water returned to the condenser: 42° C. (line 7); temperature to which water is heated: 50° C. (line 8).

B—Heating by heating floors

Temperature of the water returned to the condenser: 20.5° C.; temperature to which water is heated: 34° C.

The flow rates of water in the evaporator and in the condenser depend on the capacity of the heat pump corresponding to the working fluid employed.

The following Table I shows the results obtained in case A and in case B when:

the heat pump is operated with pure chlorodifluoromethane (R 22), the heat pump is operated with a non-azeotropic mixture comprising: 85% by mole of chlorodifluoromethane (R 22) and 15% by mole of trifluoromethane (R 23).

COP represents the ratio of the delivered thermal power to the compression power transmitted to the fluid.

TABLE I

| WORKING CONDITIONS | A | | B | |
| --- | --- | --- | --- | --- |
| Fluid | R22 | mixture R22/R23 | R22 | mixture R22/R23 |
| Thermal power (W) | 14260 | 17101 | 14820 | 18376 |
| COP | 3.52 | 3.48 | 4.56 | 4.63 |
| Input pressure (bars) | 4.65 | 5.72 | 4.50 | 5.62 |
| Output pressure (bars) | 20.64 | 25.13 | 15.15 | 18.42 |
| Compression rate | 4.44 | 4.39 | 3.37 | 3.28 |

The proposed mixture, as compared to pure R 22 for identical temperature conditions at the hot and the cold sources, gives a 20% increase of the thermal capacity in case A and a 24% increase in case B, the COP being practically unchanged in both cases.

The thermal power and the COP obtained with the R22/R23 mixture are also noticeably higher than those obtained with the azeotrope R 502 when used alone. for example, in case A, R 502 gives a thermal power of 14545 W—i.e. a gain of only 2% with respect to pure R 22—and a COP of 3.26. More generally, the composition of the proposed mixtures may be optimized to obtain a gain of thermal capacity higher than 20%, as compared with a pure fluid, and a COP identical to that of the reference pure fluid. These performances cannot be obtained by substituting, for example, R 502 to R 22 or R 500 to R 12.

The above-mentioned U.S. Pat. No. 4,344,292 describes a mixture composed of R 22 and chlorotrifluoromethane R 13 (B.P.=−81.4° C.). The results obtained with this mixture comprising 85% by mole of R 22 and 15% by mole of R 13 are compared, in Table II, with those obtained when using the above R22/R23 mixture (85%/15%).

TABLE II

| WORKING CONDITIONS | A | | B | |
|---|---|---|---|---|
| MIXTURE | R22/R23 | R22/R13 | R22/R23 | R22/R13 |
| Thermal power (W) | 17.101 | 16.214 | 18.376 | 17.488 |
| COP | 3.48 | 3.43 | 4.63 | 4.55 |
| Input pressure (bars) | 5.72 | 5.65 | 5.62 | 5.54 |
| Output pressure (bars) | 25.13 | 24.37 | 18.42 | 18.01 |
| Compression rate | 4.39 | 4.32 | 3.28 | 3.25 |

Thus, for practically identically working pressures, the R22/R23 mixture gives a heat power substantially higher than that obtained with the R22/R13 mixture.

The heating temperature attained with a heat pump of the water/water or air/water type operated with the R22/R23 mixture will be lower than 55° C., and preferably lower than or equal to 52° C. if it is desired that the output pressure be lower than 30 bars and preferably lower than 28 bars. The molar fraction of R23 in a R22/R23 or R502/R23 mixture will preferably be comprised between 12% and 18%. The variation of the water temperature in the condenser will preferably be comprised between 5° C. and 15° C., in order to approach the condensation range of the mixtures proposed in the invention. In the case of a pure fluid, the condensation temperature is not substantially affected by the water return temperature, since it is basically higher than the heating temperature. Conversely, when using the proposed non-azeotropic mixtures in a counter-current water condenser, the temperature at the end of the condensation and the corresponding pressure depend directly on the temperature at which water is supplied to the condenser. Thus, in the above working case A, the condensation range for the mixture is 8° C., as well as the variation of the water temperature (42°-50° C.).

The working technique disclosed in U.S. patent application No. 339,565 has an additional advantage as concerns the thermal capacity when using a given non-azeotropic fluid mixture. This is the object of example No. 2.

EXAMPLE 2

Figure 2:
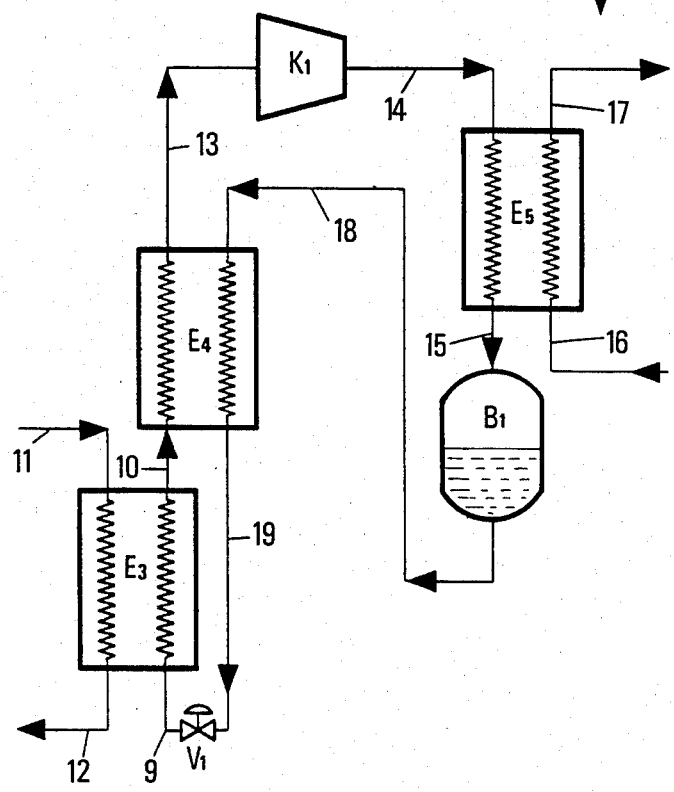
FIG. 2 is another embodiment of heat pump showing the use of the composition of the present invention.

The method of operation of the heat pump is shown in FIG. 2.

The mixed working fluid, discharged through duct 9 from the expansion valve, is partially vaporized in evaporator E 3 by the cooling effect of water from the cold source which circulates counter-currently to the working fluid and which is fed to evaporator E 3 through duct 11 and discharged therefrom through duct 12. The working fluid, discharged from evaporator E 3 through duct 10, is completely vaporized and optionally overheated in exchanger E 4, by counter-current exchange with the subcooled condensate supplied to E 4 through duct 18 and discharged through duct 19.

The mixed working fluid in gas state is sucked or drawn in compressor K 1 through duct 13 and expelled at high pressure through duct 14. It is then subcooled and completely condensed in condenser E 5 to which it is fed through duct 14 and discharged in the state of saturated liquid through duct 15. During the condensation in E 5, the mixture transfers useful thermal power to the heating water which, between the input duct 16 and the output duct 17, circulates counter-currently to the working fluid. The mixture, once condensed in E 5, is fed through duct 15 to the storage drum B 1 and discharged through duct 18; it is then subcooled in exchanger E 4 and fed to the expansion valve V 1 through duct 19.

As concerns the capacity, this arrangement provides an improvement when the working fluid is a non-azeotropic mixture of fluids, since the exchanger E 4, where the vaporization is terminated, allows the mixture to attain a higher final boiling temperature, thus an increased suction pressure. This process results both in a reduction of the molar volume at the suction point and in a decrease of the compression rate.

Table III shows the results obtained with the same mixture and under the same working conditions as in example 1. The results obtained with pure chlorodifluoromethane (R 22) in example 1 are mentioned by way of reference. The operating diagram of FIG. 2 does not alter the performances of the heat pump working with a pure fluid. The mixture specified in example 1 has the following molar composition: chlorodifluoromethane (R 22): 85% and trifluoromethane (R 23): 15%. The working cases A and B have been explained in example 1.

According to the operating diagram of FIG. 1, the selected mixture increases the thermal capacity of the plant, when operated with R 22, by 28% in case A and 30% in case B. The COP obtained with chlorodifluoromethane is also increased by 2.8% in case A and 5.2% in case B.

The diagram of FIG. 2 requires the additional investment corresponding to exchanger E 4, but this investment is low.

In the present example, this exchanger may be made up of two concentrical smooth tubes having a contact surface of 0.25 m$^2$.

TABLE III

| WORKING CONDITIONS | A | | B | |
|---|---|---|---|---|
| Fluid | R22 | R22/R23 | R22 | R22/R23 |
| Thermal power (W) | 14260 | 18324 | 14820 | 19268 |
| COP | 3.52 | 3.62 | 4.56 | 4.80 |
| Input pressure (bars) | 4.65 | 6.10 | 5.72 | 5.88 |
| Output pressure (bars) | 20.64 | 25.09 | 15.15 | 18.37 |
| Compression rate | 4.44 | 4.11 | 3.37 | 3.13 |

EXAMPLE 3

Operating as in the case B of example 1, the respective proportions of the components R 22 and R 23 have been modified. The results are given in the following Table IV.

TABLE IV

| Composition (% molar) | | Results | |
|---|---|---|---|
| R 22 | R 23 | COP | Thermal power (kW) |
| 1 | 0 | 4.56 | 14.82 |
| 0.95 | 0.05 | 4.62 | 17.19 |
| 0.80 | 0.20 | 4.60 | 19.56 |
| 0.70 | 0.30 | 4.54 | 21.49 |

The following claims concern mixtures with two essential constituents, as described in the present patent application. It is clear that the invention also concerns mixtures containing, in addition to the above constituents, minor quantities (less than 5% by mole and preferably less than 1% by mole) of impurities which do not alter substantially the good behavior of these mixtures when used in heat pumps or for house thermal conditioning, these impurities being, for example, halogenated derivatives of hydrocarbons other than those claimed, for example those obtained as by-products in the manufacture of the claimed halogenated derivatives.

What is claimed is:

1. A composition consisting essentially of a non-azeotropic mixture of:
   (a) a major component of monochlorodi-fluoromethane ($R_{22}$) with
   (b) a minor component of the trifluoromethane ($R_{23}$).

2. A composition according to claim 1, comprising 99–70% by mole of monochlorodifluoromethane with 1–30% by mole trifluoromethane.

3. A composition according to claim 2, comprising 85% by mole of monochlorodifluoromethane with 15% by mole of trifluoromethane.

4. A composition consisting essentially of a non-azeotropic mixture of:
   (a) 97 to 75% by mole of monochlorodifluoromethane (R 22) with
   (b) 3 to 25% by mole of trifluoromethane (R 23).

5. A composition according to claim 4, comprising 95 to 80% by mole of monochlorodifluoromethane (R 22) with 5 to 20% by mole of trifluoromethane (R 23).

6. A composition according to claim 4 further comprising impurities which are halogenated derivatives of hydrocarbons which do not materially affect the properties of the composition.

7. A composition according to claim 6 wherein the impurities are by-products obtained in the manufacture of monochlorodifluoromethane and trifluoromethane.

* * * * *